J. BROWN.
LIFE SAVING BELT OR BUOY.
APPLICATION FILED JAN. 14, 1915.
1,156,749.
Patented Oct. 12, 1915.
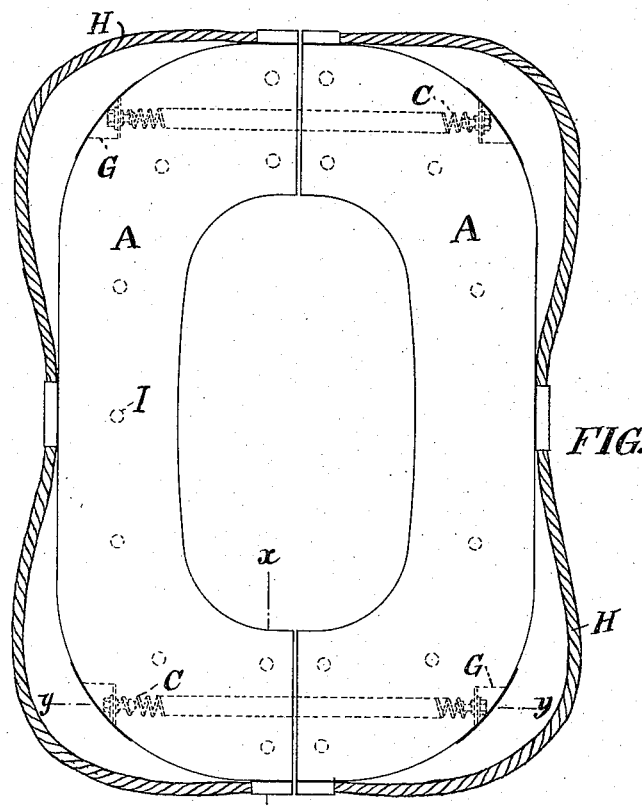
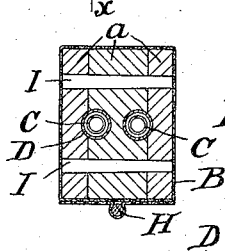
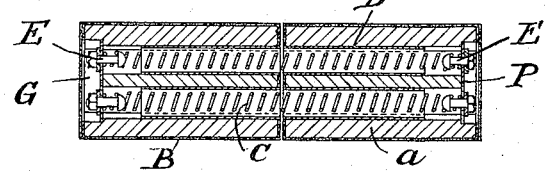
Witnesses
Inventor
James Brown,
By Dodge and Sons
Associate Attorneys.

UNITED STATES PATENT OFFICE.

JAMES BROWN, OF LIVERPOOL, ENGLAND.

LIFE-SAVING BELT OR BUOY.

1,156,749.  Specification of Letters Patent.  Patented Oct. 12, 1915.

Application filed January 14, 1915. Serial No. 2,180.

*To all whom it may concern:*

Be it known that I, JAMES BROWN, a subject of the King of Great Britain, residing at Liverpool, in the county of Lancaster, in the Kingdom of England, have invented certain new and useful Improvements in Life-Saving Belts or Buoys, of which the following is a specification.

This invention has reference to life-saving belts or buoys applicable for supporting a body in the water.

It is characterized by the feature that the belt or buoy is made extensible, so as to enable it to be applied to individuals of various figures or builds, and be held thereon in the position most suitable for keeping the body upright in the water.

The invention will be understood from the following description, reference being had to the accompanying drawings, in which—

Figure 1 is a general view of the life saving belt or buoy, Fig. 2 a cross section on line *x x* of Fig. 1, and Fig. 3 a cross section on line *z z* of Fig. 1.

The life saving belt or buoy of this invention, comprises two members A made of cork inclosed in a protecting cover of canvas B, these two members being joined together by elastic connecting pieces C. The said members A may be of any suitable shape, so that when placed together they form a ring shaped belt or float of oval, or circular, or rectangular or other suitable shape. The preferred shape is rectangular with rounded corners, and made oblong, that is rather greater in length than in width. The cork of which these members are made may be in two, three or more plies or thicknesses *a* joined together by pegs I, and the elastic connecting strips C (which are preferably helical springs) are gripped between the plies of cork, so that collectively the cork members A and connecting pieces C form a complete buoy or float. The helical springs C which connect the members A together, are contained within holes D in the said members, and at the outer ends are provided with bolts E the heads of which engage the helices of the springs or are otherwise attached, while the shanks of the bolts project through washer plates F located in recesses G at the outer ends of the holes and are secured by nuts. The protecting cover of canvas B which incloses the cork members A and covers the recesses G, may have straps H to hang up the buoy when not in use, or to serve for supporting the buoy from the shoulders.

To fasten the buoy on the body, it is passed downward over the head or upward from the feet, and being extensible and expansible by means of the elastic connecting pieces C, can be forced on to the body at the chest, and be held in position immediately below the arm pits. The elastic or extensible nature of the belt or buoy enables it to be applied to individuals of various figures or builds; and in use, the device can be turned, so that the narrow width may lie from back to front of the body, or the wide width can lie from back to front, according to the size or build of the wearer.

I declare that what I claim is:—

1. A life-saving belt or buoy, comprising two sections formed of laminated cork, the ends of the sections normally abutting, and each provided with an opening adapted to aline with an opening in the abutting end of the opposite section; and an elastic connecting member housed in said alined openings and connected to the sections, whereby the ends of the sections will be normally held in contact with each other but may be separated in the act of placement of the belt or buoy upon the body of the user.

2. In a life saving belt or buoy the combination of two buoyant members and elastic connecting pieces therefor comprising helical springs contained within holes in the buoyant members and secured at the outer ends to washer plates located in the recesses at the outer ends of the holes.

In witness whereof, I have hereunto signed my name this 2 day of Jan., 1915, in the presence of two subscribing witnesses.

JAMES BROWN.

Witnesses:
G. C. DYMOND,
R. W. WILLIAMS.

Copies of this patent may be obtained for five cents each, by addressing the "Commissioner of Patents, Washington, D. C."